US008930347B2

(12) United States Patent
Broll et al.

(10) Patent No.: US 8,930,347 B2
(45) Date of Patent: Jan. 6, 2015

(54) INTERMEDIATE RESULT SET CACHING FOR A DATABASE SYSTEM

(71) Applicant: International Business Machines Corporation, Armonk, NY (US)

(72) Inventors: Bjoern Broll, Waldenbuch (DE); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/710,665

(22) Filed: Dec. 11, 2012

(65) Prior Publication Data

US 2013/0159283 A1 Jun. 20, 2013

(30) Foreign Application Priority Data

Dec. 14, 2011 (EP) ..................................... 11193441

(51) Int. Cl.
*G06F 17/30* (2006.01)

(52) U.S. Cl.
CPC .... *G06F 17/30442* (2013.01); *G06F 17/30457* (2013.01)
USPC ........................................................ 707/716

(58) Field of Classification Search
CPC .................... G06F 17/30457; G06F 17/30442; G06F 17/30463
USPC .......................................................... 707/716
See application file for complete search history.

(56) References Cited

U.S. PATENT DOCUMENTS

| 7,133,861 | B2 | 11/2006 | Day et al. | |
|---|---|---|---|---|
| 7,877,381 | B2* | 1/2011 | Ewen et al. | 707/719 |
| 7,921,103 | B2* | 4/2011 | Olston et al. | 707/717 |
| 8,423,534 | B2* | 4/2013 | Burger et al. | 707/718 |
| 2002/0107835 | A1* | 8/2002 | Coram et al. | 707/1 |
| 2004/0181521 | A1 | 9/2004 | Simmen | |
| 2004/0236726 | A1 | 11/2004 | Ewing et al. | |
| 2008/0183684 | A1 | 7/2008 | Bestgen et al. | |
| 2010/0306188 | A1 | 12/2010 | Cunningham et al. | |
| 2011/0313999 | A1* | 12/2011 | Bruno et al. | 707/718 |
| 2013/0191370 | A1* | 7/2013 | Chen et al. | 707/718 |

FOREIGN PATENT DOCUMENTS

| KR | 2005083463 | 8/2005 |
|---|---|---|
| WO | WO2004104729 | 12/2004 |

OTHER PUBLICATIONS

A. Safaeei, et al., Caching Intermediate Results for Multiple-Query Optimization, Computer Systems and Applications, 2007. AICCSA '07, IEEE/ACS International Conference on Issue Date: May 13-16, 2007, pp. 412-415.

* cited by examiner

*Primary Examiner* — Cheryl Lewis
*Assistant Examiner* — Loc Tran
(74) *Attorney, Agent, or Firm* — Cantor Colburn LLP; Dermott Cooke (57) ABSTRACT

A method for storing intermediate result sets in a database is provided. An access plan for a single query for accessing data stored in the database system is received. An intermediate result set is generated during execution of the access plan. A value of an intermediate result set rating of the intermediate result set is determined during execution of the access plan at runtime of the query for determining if the intermediate result set, generated during the execution of the access plan, is to be stored. Based on determining that the value of the intermediate result set rating meets a predefined criterion, the determined intermediate result set is stored for a longer period of time than the runtime of the query as a stored intermediate result set.

20 Claims, 5 Drawing Sheets

INTERMEDIATE RESULT SET CACHING FOR A DATABASE SYSTEM

PRIORITY

The present application claims priority to European Patent Application No. 11193441.0 filed on 14 Dec. 2011, and all the benefits accruing therefrom under 35 U.S.C. §119, the contents of which in its entirety are herein incorporated by reference.

BACKGROUND

The disclosure relates generally to database systems, and more specifically to storing intermediate result sets in a database system.

Today, the amount of data stored and processed by database systems are growing at an accelerating pace. In particular, the demand for high query performance is increasing with the growing number of data.

The database or database system, in particular, a relational database system, may store data as a series of logical tables. Each table may include rows and columns and may be identified by a unique name within the database system. Also columns may have unique identifiers within a given table. In order to access data in a database, a user or application program may direct a query, i.e., a statement in a data manipulation language, e.g., a version of the structured query language (SQL), to the database system. When the database system receives a query, the database system may interpret the query and may determine a series of internal steps required for answering the query.

This series of internal steps is often referred to as an execution plan or an access plan. An internal step may, for example, be a join operation, a sort operation, a selection operation or a projection operation. The query is usually written in a declarative language, e.g., in SQL (Structured Query Language), and the query specifies what data to return but not how to accomplish this. The access plan is usually written in an imperative language, and it specifies a sequence of concrete computation steps to return the data requested.

The creation of an access plan is typically the task of a software component that is often referred to as a query optimizer or simply an optimizer. It may be noteworthy to mention that for a given query, multiple access plans can be created, which all might be able to answer the query, but which may differ in their internal steps and as a consequence also in their resource consumption. The optimization of the internal steps may be performed according to different priorities and algorithms of the query optimizer.

In order to keep the resource consumption for the creation and the execution of an access plan as low as possible, a series of query optimization techniques has been developed within the last few decades. However, most of these techniques only focus on an individual query optimization and hence are stateless, meaning that when a query is executed twice in a row, all steps of the access plan are executed again. Therefore, in most state of the art query optimization techniques, a subsequent execution of an access plan is usually not able to reuse the "knowledge" achieved during an earlier execution of the access plan. The gathered knowledge is usually lost immediately after the execution of an access plan.

The following are examples of query processing where reuse of knowledge achieved during earlier execution of an access plan is possible to a limited extent.

Document US 2004/0236726 A1 discloses a system and method for query result caching. In this method, a caching system is presented which is located between the database application and the database server. Thereby queries from the database application are routed against a caching system. When the caching system has the answer for the query already stored in the cache, the cached answer is returned. Otherwise the query is forwarded to the database system and the returned answer from the database system is stored in the caching system for future requests. The proposed method can be used only when the same query (or a query having the same normalized query text) is repeated.

Another method optimizes query processing in environments which are able to execute queries asynchronously (e.g., in a batch like manner), where queries are collected and analyzed in a sliding window. Common parts of the queries are identified and finally the queries are executed at the end of the sliding window in such a manner that common parts of the queries are only computed once for all queries. The proposed method works for processing queries in a batch like manner.

On the other hand, storing all the knowledge generated during the execution of an access plan may be very resource intensive, especially, in light of growing data volumes. This may have a negative effect on the overall database system performance, which is also not desirable.

Thus, there may be a need for an improved method of handling queries in a database system by managing access plans and treating the different steps necessary during execution of an access plan in a modified and optimized way.

SUMMARY

An embodiment is a method for storing intermediate result sets in a database system. An access plan for a single query for accessing data stored in the database system is received. An intermediate result set is generated during execution of the access plan. A value of an intermediate result set rating of the intermediate result set is determined during execution of the access plan at runtime of the query for determining if the intermediate result set, generated during the execution of the access plan, is to be stored. Based on determining that the value of the intermediate result set rating meets a predefined criterion, the determined intermediate result set is stored for a longer period of time than the runtime of the query as a stored intermediate result set.

Another embodiment is a system including a receiving unit configured to receive an access plan for a single query for accessing data stored in the system. A generating unit is configured to generate an intermediate result set during execution of the access plan. A determining unit is configured to determine a value of an intermediate result set rating of the intermediate result set during execution of the access plan at runtime of the query for determining if the intermediate result set, generated during the execution of the access plan, is to be stored. A storage unit is configured to store the determined intermediate result set for a longer period of time than the runtime of the query.

A further embodiment is a computer program product for storing intermediate result sets in a database system. The computer program product includes a computer readable storage medium having program code embodied therewith, the program code executable by a processor to receive an access plan for a single query for accessing data stored in the database system. An intermediate result set is generated during execution of the access plan. A value of an intermediate result set rating of the intermediate result set is determined during execution of the access plan at runtime of the query for determining if the intermediate result set, generated during the execution of the access plan, is to be stored. Based on determining that the value of the intermediate result set rating meets a predefined criterion, the determined intermediate result set is stored for a longer period of time than the runtime of the query as a stored intermediate result set.

BRIEF DESCRIPTION OF THE SEVERAL VIEWS OF THE DRAWINGS

Embodiments will now be described, by way of example only, and with reference to the following drawings.

DETAILED DESCRIPTION

Exemplary embodiments provide a method for storing intermediate result sets in a database system, an intermediate result sets storage unit, a database system, a computer system, a database processing program, and a computer program product. According to one embodiment, a method for storing intermediate result sets in a database system may be provided. The method may include receiving an access plan for a single query for accessing data stored in the database system, and generating an intermediate result set during an execution of the access plan. The method may also include determining a value of an intermediate result set rating of the intermediate result set during an execution of the access plan at runtime of the query for determining if the intermediate result set generated during the execution of the access plan, is to be stored. Furthermore, the method may include storing the determined intermediate result set for a longer period of time than the runtime of the query as a stored intermediate result set, if the value of the intermediate result set rating meets a predefined criterion. In particular, this stored intermediate result set may be used again after the execution of the access plan has ended.

In another embodiment, an intermediate result set storage unit may be provided. The intermediate result set storage unit may include a receiving unit adapted for receiving an access plan for a single query for accessing data stored in the database system, as well as a generating unit. The generating unit may be adapted for generating an intermediate result set during an execution of the access plan. Furthermore, a determining unit may—as part of the intermediate result set storage unit—be adapted for determining a value of an intermediate result set rating of the intermediate result set during execution of the access plan at runtime of the query for determining which intermediate result set, generated during the execution of the access plan, is to be stored. Furthermore, the intermediate result set storage unit may include a storage unit adapted for storing the intermediate result set longer than the runtime of the query.

In an embodiment, an intermediate result set, i.e. a result of an access plan operation, is stored. The storage of the intermediate result set may have the advantage that future access plans may be able to reuse the stored intermediate result set, e.g., to reduce the access plan execution costs and/or execution time. It may be noteworthy to mention that all access plans, that are able to replace parts of their access plan operation by the stored intermediate result set, may be able to benefit from the stored intermediate result set.

There may be one or multiple intermediate result sets that are stored when processing a given access plan, the multiple intermediate result sets relating to (at least partially) different operations in the access plan.

As previously described, an access plan for a query may be received from a query optimizer, or alternatively from an access plan storage pool when the query was already compiled by a query optimizer at an earlier point-in-time. The access plan may include one or more database system specific operations for answering the query. The data generated during execution of an access plan operation, e.g., a JOIN operation, may be seen as an intermediate result set. Since the access plan may include multiple operations, multiple intermediate result sets may exist per access plan. Also the final result set of an access plan may be seen as an intermediate result set.

Since storing every intermediate result set of an access plan may be very resource intensive and may not be practical, a solution may be needed to identify intermediate result sets that may have a certain "quality" for later reuse. The determination of a value of an intermediate result set quality may be understood as a specific form of a rating. The intermediate result set rating may, in particular, be based on workload independent properties (e.g., calculating costs and/or volume reduction) and/or workload driven properties (e.g., reuse probability and/or invalidation likelihood).

It may also be noted, that the determination of a value of an intermediate result set rating, in particular, a quality for later reuse may be evaluated at runtime of the access plan. This may be advantageous compared to other approaches of the state of the art. Instead of just one intermediate result set, several intermediate result sets relating to a single access plan may be rated.

Another noteworthy feature of embodiments is that only a single access plan may be required for determining an intermediate result set quality, indicating the usefulness of storing the intermediate result set. This may be an advantageous in contrast to concepts requiring a joint view on a multitude of queries for identifying common parts between queries, e.g., by using a sliding time window, and executing the queries in a batch like mode at the end of the time window in such a manner that common parts are only computed once for all queries. These joint-view techniques are likely not useful for OLTP (online transaction processing) environments since they may require asynchronous query processing. To the contrary, embodiments can be used in OLTP environments and also for OLAP (online analytical processing) environments.

In the context as used herein, the following conventions have been followed:

Database system—A database system, or simply a database, may denote any database management system providing an interface for accessing data stored within the database by so-called queries. In a relational database system, the data within the database may be organized in relations. The relations may be implemented in a table-like form having columns and rows. Indexes on the columns of the tables may be used to increase the access performance to the data.

Access plan—The term access plan may denote a sequence of database system specific operations required for answering a given query. The access plan is usually written in an imperative language and may be generated by a query optimizer. The database system specific operations may include but are not limited to: table access operations, index access operations, joining operations, selection operations, sorting operations and projection operations.

Intermediate result set—The term intermediate result set may denote a set of data that may be generated during an execution of an access plan. Such an intermediate result set may be the result of an execution of an operation, e.g., a JOIN operation, of the access plan and may also be organized in table form. It may be stored inside or outside the database system. Depending on the number and types of operations involved in the access plan there may be various intermediate result sets being generated during an execution of the access plan. In state of the art database systems, intermediate result sets may only exist during runtime of an access plan. The intermediate result sets may not be available for later reuse. In contrast to this and according to embodiments, intermediate result sets may be stored and may also be accessible after the runtime of the access plan. A decision for storing the intermediate result set for later reuse may be based on a rating. It will also be understood, that when intermediate result sets can exist for a longer period of time than the runtime of the access plan, the data of the stored intermediate result sets can be outdated. A stored intermediate result set may be outdated if the underlying base data in a table of the database or in another object in the database does not correspond any longer to the derived data in the stored intermediate result set. This may be the case, if the underlying base data have changed, e.g., due to an update, insert, or delete operation. In case a stored intermediate result set is outdated, it may not be reused anymore—e.g., for the adaption of access plans—especially, when data accuracy is required.

Intermediate result set rating—The term intermediate result set rating may denote a valuation of an intermediate result set—in particular an intermediate result set quality—, of which its values may be determined—in real time—during execution of an access plan. The quality of an intermediate result set may denote how "useful" storage of an intermediate result set may be for future access plan executions. It may be noted that the value of an intermediate result set rating may be based on a single access plan execution. Other queries or their corresponding access plans may not be known at all at the time of the rating. If the value of the intermediate result set rating meets a predetermined criterion, the intermediate result set may be stored for later use. Such a criterion may be, e.g., a fixed or relative value—compared to other intermediate result sets—which may have to be less than or may have to be more than a weighted combination of the following intermediate result set properties: the costs, and/or the volume reduction, and/or the reuse factor and/or the invalidation likelihood and/or other properties of the intermediate result set.

Costs—The term cost or costs may denote computing resources required for generating a specific result. A way to measure costs may, in particular, be CPU cycles, required to perform a specific operation, or, as another example, a number of input/output (I/O) operations required to generate a specific result.

Base data—The term base data may denote data being stored in objects of the database system, in particular, tables or indexes that may have been used to generate an intermediate result set. Base data may also refer to data being stored in objects of the database system which may not have been used during generation of an intermediate result set, but may be used in the generation of the intermediate result set when recomputed. For example, in case new data may have been added to objects involved in the generation of the intermediate result set.

Lock—The term lock may denote a flag or indicator for specific objects in the database system. The object may, e.g., be a row, a database page, a database table, or other objects within a database system. Locks may be used in a database system to ensure the isolation criteria.

Weak-lock—The term weak-lock may denote a specific, new lock type advantageous for the method for storing intermediate result sets. A weak-lock may be set on the base data (or to a higher granularity of the base data, e.g., a page, a table, a table space) of an intermediate result set. A weak-lock may be set on the base data or to a higher granularity of the base data during an execution of an access plan. However, it may exist for a longer period of time than the execution of the access plan. It may, in particular, indicate that for the specific database object a stored intermediate result set may exist, and which result set may have been derived from this database object.

Disadvantages of known techniques for improving query performance may be overcome according to embodiments. In particular, negative effects of database administrator controlled approaches like materialized query tables may be overcome. In those approaches, a database administrator or developer may need to be involved in identification of the most common queries and may need to think about a design for one or more materialized query tables which could be used to accelerate queries. It may also be noted that, when workload characteristics may change over time, materialized query tables, respectively potential query optimizer hints, may not be adjusted by the database system when using a database administrator controlled approach. It may also be noted that user controlled approaches usually only interact on a query level. Hence the level of detail for optimizing queries may be limited in contrast to embodiments which are based on an access plan level.

Embodiments may offer the advantage that the database system itself may take care of the identification of intermediate result sets which may be generated during an execution of an access plan, and which may very likely be reused by other access plans at a later point in time. This may be done in a transparent way from an application perspective. Due to this fact, this approach may be used with any existing applications and may not be limited to special written applications as required by other approaches. Another advantage of embodiments may be in ensuring accuracy of the intermediate result set when it may be cached so that it may be used even within OLTP systems to accelerate queries.

In one embodiment, if the same access plan is received again, the method may additionally include adapting dynamically the access plan during the execution of the access plan, where the adaption may be based on an existence of the (at least one) stored intermediate result set relating to this access plan. The generation of such intermediate result set may thus be avoided by reusing the stored intermediate result set when later processing the same access plan. Similarly, another access plan that contains the same operations as the access plan operations, based on which intermediate result set was stored, may be adapted to use the stored intermediate result set. The adaption may mean that a stored intermediate result set may be used as a replacement for a part of the operations of the (same or another) access plan. This specific part of the access plan may then not be executed but the already existing stored intermediate result set may be used instead.

The adaption of an access plan may, in particular, result in a faster execution of the access plan because the intermediate result sets—which would usually be generated during the normal access plan execution—may not have to be generated if an equivalent stored intermediate result set exists. The adaption may also be performed in a pre-execution phase of the access plan. The adaption may mean a reuse of an intermediate result set beyond the scope of a single access plan execution.

In another embodiment, the determination of the value of the intermediate result sets rating may include a calculation of costs for generating the intermediate result set, where the costs are indicative of resource consumption for the generation of the intermediate result set. In particular, the costs may be measured in, e.g., CPU cycles required for generating the intermediate result set and/or a number of I/O operations required for generating the intermediate result set. The higher the costs are, the higher the savings may be by reusing the intermediate result set in a future access plan.

In yet another embodiment, the determination of the value of the intermediate result set rating may include a calculation of a volume reduction of the intermediate result set in comparison to a related base data size. Similar to the calculation of costs also the calculation of a volume reduction may be recognized as a metric for the rating process. However, the smaller the intermediate result set size may be compared to the base data size, the better the volume reduction is and the more it may be reasonable to cache or store the intermediate result set. The volume reduction size may be computed by the quotient as follows:

$$\frac{\text{(amount of data in the intermediate result set)}}{\text{(amount of base data used for the generation of the intermediate result set)}}$$

This ratio may be a unit-less number because above and below the fraction line the same unit may be used. The respective amount of data may be calculated by the sum of the number of respective rows multiplied by the length of each row.

In another embodiment, the determination of the value of an intermediate result set rating may include a calculation of a reuse factor for the intermediate result set, where the reuse factor is indicative of a number of accesses to the intermediate result set in comparison to a total number of executed access plans in a predefined timeframe. When calculating the rating, an access may mean the generation of the intermediate result set as well as a reuse of the intermediate result set.

This more detailed specification may be seen as a workload driven rating. It may be achieved by observing the workload of the database. The process may determine how well intermediate result sets may fit to the actual workload characteristic of the database system.

The reuse factor may reflect how often the intermediate result set may be used. The higher the factor is, the more likely an intermediate result set may be used in future access plan executions. For a given time interval T, the reuse factor of an intermediate result set may be computed by the quotient as:

$$\frac{\text{(number of times an intermediate result set was accessed)}}{\text{(total number of executed access plans)}}$$

The reuse factor may evolve over time and may also be indicative of which intermediate result sets may be removed from cache when the cache size may reach its limit. This may ensure that when the cache may be full, only often used intermediate result sets may be stored in the cache.

Another kind of workload-driven rating of an intermediate result set may be explained as follows. According to another embodiment, the determination of a value of the intermediate result set rating may include a determination of an invalidation likelihood due to changes in the underlying base data.

Intermediate result sets may be outdated if the underlying base data may change. For example, rows may be inserted, updated or removed in/from a table used during the generation of the intermediate result set. In that case, the stored intermediate result set may not be reused, when data accuracy is needed. The probability that such a case may occur may be called invalidation likelihood. The lower the invalidation likelihood is, the more likely a caching of intermediate result sets may be reasonable because the intermediate result set may still be accurate when it may be reused later.

It may be noted that when strict data accuracy is not required, e.g., in some OLAP applications, even outdated intermediate result sets might be reused to accelerate access plans. If both approaches—strict and non-strict—may be united in a database management system, it may, e.g., be realized by an additional SELECT statement keyword in the form of "SELECT . . . ACCEPT OUTDATED DATA" or by introducing a new session variable that defines the data accuracy level for an entire session. This may require an adaptation of the related software applications. The invalidation likelihood of an intermediate result set may be computed for a given time interval T by:

1−((number of times a valid intermediate result set was available during a reuse request)/(total number of intermediate result set reuse requests))

In another embodiment, the method may include additionally locking of the base data related to a stored intermediate result set before accessing the stored intermediate result set during the execution of an adapted access plan. This may be required in order to keep the isolations levels of the database system intact. The locks may, in particular, be released during the commit or abort statement of the transaction in which the adapted access plan was involved.

In another embodiment, the method may include additionally monitoring the base tables related to a stored intermediate result set, and marking the stored intermediate result set invalid if the related base data are changed.

In order to identify changes in the base tables which may affect the accuracy of a stored intermediate result set, two approaches are exemplarily presented:

In the first approach a modification check rule—in subsequent references also simply called "check rule"—may be applied to tables which were involved in the generation of a stored intermediate result set. The check rule may include of the selection criteria, e.g., the predicates, which were used on the base tables during the intermediate result set generation. The check rule may also contain a reference to the stored intermediate result set.

When the database system intends to modify a table that has a check rule applied, the check rule may have to be evaluated. The evaluation may include the following process:

1. When the intended modification is an insert operation, check if the new row may satisfy the selection criteria of the check rule. In case the new row satisfies the selection criteria, the referenced stored intermediate result set may be marked as invalid.
2. When the intended modification is a delete operation, check if the row pending deletion may satisfy the selection criteria of the check rule. In case the row pending deletion satisfies the selection criteria, the referenced stored intermediate result set may be marked as invalid.

3. When the intended modification is an update operation, the operation may be seen as a deletion of a row and an insert of a row as described in steps 2 and 1.
4. If any of the previous steps has marked the stored intermediate result set as invalid, the check rule for the stored intermediate result set may be removed from the base table. Moreover the stored intermediate result set may be removed from cache.

A check rule on a base table may be indicative of an existence of a stored intermediate result set.

In the second approach, one or more weak-locks may be set on the tables of the base data of a stored intermediate result set. The weak-lock may contain a reference to the stored intermediate result set.

It may be noted that when a database system modifies a database object which is flagged by a weak-lock, the intermediate result set referenced in the weak-lock may be marked as invalid. The weak-lock may be removed after the referenced intermediate result set is marked invalid.

The following table may show the compatibility between weak-locks and "common" database locks (S=Shared, X=eXclusive):

| First lock requested in row | locking compatibility | | |
|---|---|---|---|
| | second in column | | |
| | W-lock | S-lock | X-lock |
| W-lock | compatible | compatible | X-lock may be granted; intermediate result set referenced in the weak-lock may be marked invalid; weak-lock may be removed |
| S-lock | compatible | as usual | as usual |
| X-lock | compatible | as usual | as usual |

"As usual" may refer to the locking mechanism according to the state-of-the-art of operating a database system.

The invalidation may be required in order to ensure the data accuracy of the final result set returned by an adapted access plan. When a stored intermediate result set is marked as invalid, it may not be used for the adaption of an access plan anymore. It may also be removed from cache.

Again according to another embodiment, the method may include additionally recalculating of a stored intermediate result after it was marked invalid. To recalculate the stored intermediate result set, the access plan operations resulting in the intermediate result set may have to be executed again. The recalculation of the stored intermediate result set may have the advantage that the stored intermediate result set is available for the adaption of access plans again.

Furthermore, a computer or a computer system may include an intermediate result set storage unit, as described above, and referring to the method for storing intermediate result sets. The intermediate result set storage unit may also be implemented as a component of a database system, which may be part of a computer system.

In another embodiment, a data processing program for execution in a data processing system may be provided, the data processing program including software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments have been described with reference to different subject-matter. In particular, some embodiments have been described with reference to methods whereas other embodiments have been described with reference to systems or apparatuses. However, a person skilled in the art will gather from the above and the following description that, unless otherwise notified, in addition to any combination of features belonging to one type of subject-matter, also any combination between features relating to different subject-matter, in particular, between features of the methods and features of the systems or apparatuses, is considered as disclosed herein.

The aspects defined above and further aspects are apparent from the examples of embodiments described hereinafter and are explained with reference to the examples of embodiments but is not so limited.

In the following, a detailed description of the figures will be given. All illustrations in the figures are schematic. Firstly, a block diagram of a method for storing intermediate result sets in a database system will be described. Afterwards, embodiments of the method and an intermediate result set storage unit will be described.

Figure 1:
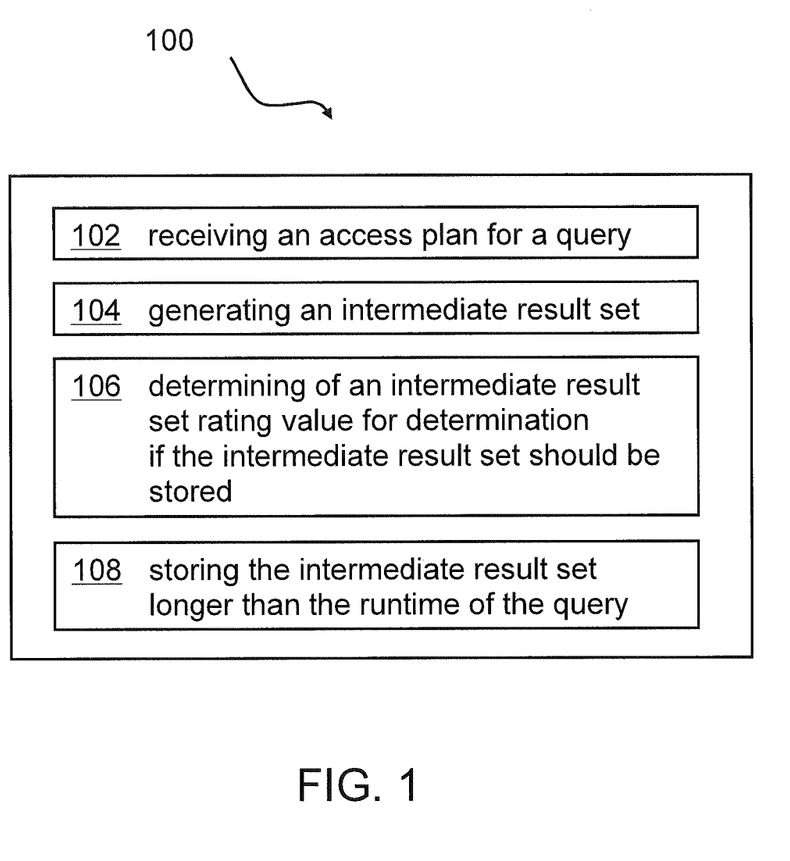
FIG. 1 is a block diagram in accordance with an embodiment.

FIG. 1 shows a block diagram of an embodiment of a method 100 for storing intermediate result sets in a database system. The method may include receiving, 102, an access plan for a single query for accessing data stored in the database system and generating, 104, an intermediate result set during an execution of the access plan. Furthermore, the method may include determining, 106, a value of an intermediate result set rating of the intermediate result set during an execution of the access plan at runtime of the query for determining if the intermediate result set, generated during the execution of the access plan, is to be stored. Additionally, the method may include storing 108, the determined intermediate result set for a longer period of time than the runtime of the query as a stored intermediate result set, if the value of the intermediate result set rating meets a predefined criterion.

This may enable the intermediate result set to be reused by another access plan at a later point in time after the termination of the first mentioned access plan. This may significantly reduce execution time of the other access plan.

Figure 2:
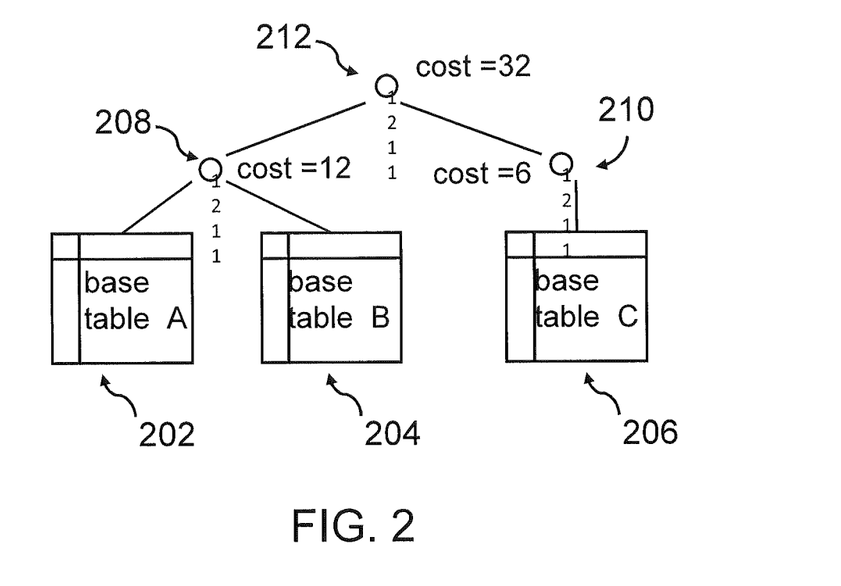
FIG. 2 is a block diagram of an embodiment of database tables that may be joined together with potential related costs.

FIG. 2 shows a block diagram of an embodiment of database tables that may be joined together with potential related costs. The example of FIG. 2 depicts three database tables 202, 204, 206. The circle 208 may symbolize a JOIN between base table A, 220 and base table B, 204. This JOIN may, for example, generate resource costs of "12". If the result of the JOIN operation 208 may—in another JOIN operation 212—be joined with another base table C, 206, which access may generate resource costs of "6", a complete JOIN 212 may result in computing costs of "32". This is just a simple example of joining three tables. Real access plans may require a much more complex JOIN of a variety of tables. Moreover, there may be other operations in the access plan, e.g., sort operations, etc., which are not listed in this example. But in any case, the computing costs for an operation of the access plan may be accumulated by combining the costs of the single access plan operations involved so far. Thus, the costs for executing the entire access plan as well as the cost for generating a specific intermediate result set can be easily derived by accumulating the costs of the single access plans operations involved in the generation.

Figure 3:
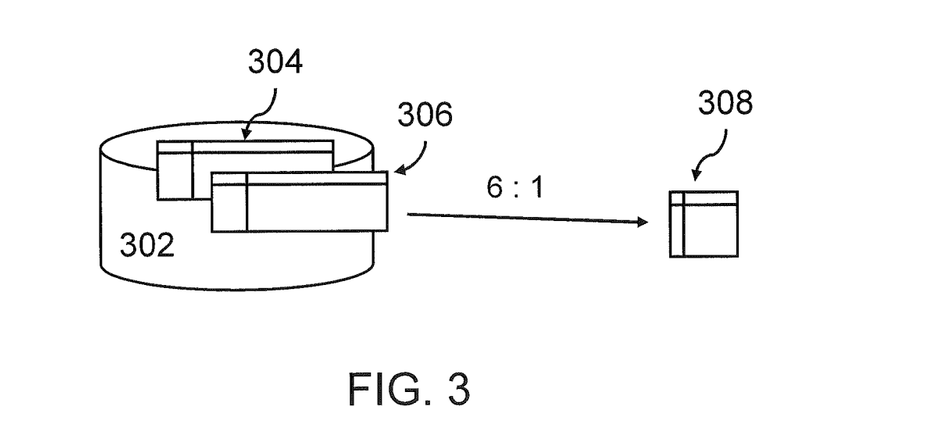
FIG. 3 illustrates a calculation of a volume reduction in accordance with an embodiment.

FIG. 3 illustrates an embodiment of a calculation of a volume reduction. In a JOIN operation, base tables 304 and 306 may be joined. The JOIN operation may lead to an intermediate result set 308. At least the base tables 304 and 306 may be part of the database system 302. However, the intermediate result set 308 may also be stored in the database 302 or in an intermediate result set storage unit on a disk, or on another storage medium. As indicated by FIG. 3, the volume reduction may be 1:6, meaning that the size of the base data 304 and 306 may be six times as large as the resulting intermediate result set 308. Storing an intermediate result set which may be smaller in size than the base data may generate lower storing costs, and thus, may be more eligible for caching. The related intermediate result set rating reflecting this volume reduction may be calculated as explained above.

Figure 4:
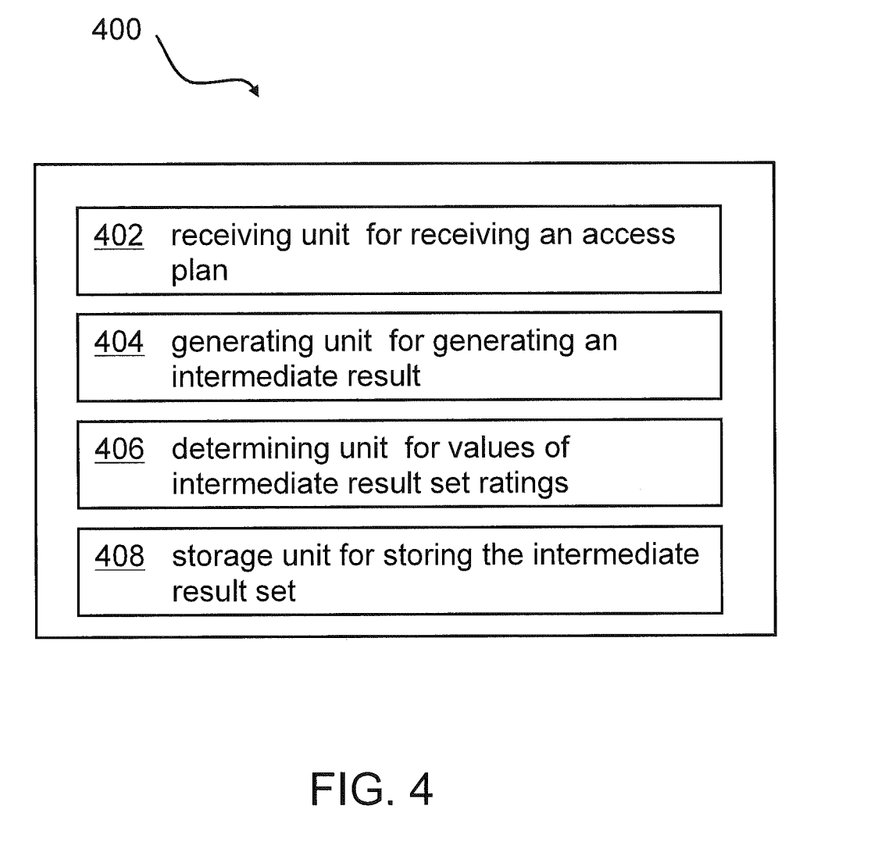
FIG. 4 is a block diagram of an embodiment of the intermediate result set storage unit.

FIG. 4 depicts a block diagram of an embodiment of the intermediate result set storage unit. The intermediate result set storage unit 400 may include a receiving unit 402 adapted for receiving an access plan for a single query for accessing data stored in the database system, and a generating unit 404 adapted for generating an intermediate result set during execution of the access plan. The intermediate result set storage unit 400 may further include a determining unit 406 adapted for determining a value of an intermediate result set rating of the intermediate result set during execution of the access plan at runtime of the query for determining if the intermediate result set generated during the execution of the access plan is to be stored.

Additionally, the intermediate result set storage unit 400 may include a storage unit 408 adapted for storing the determined intermediate result set for a longer period of time than the runtime of the query. In particular, the intermediate result set may be reused later on by an equal or by another access plan.

Figure 6A:
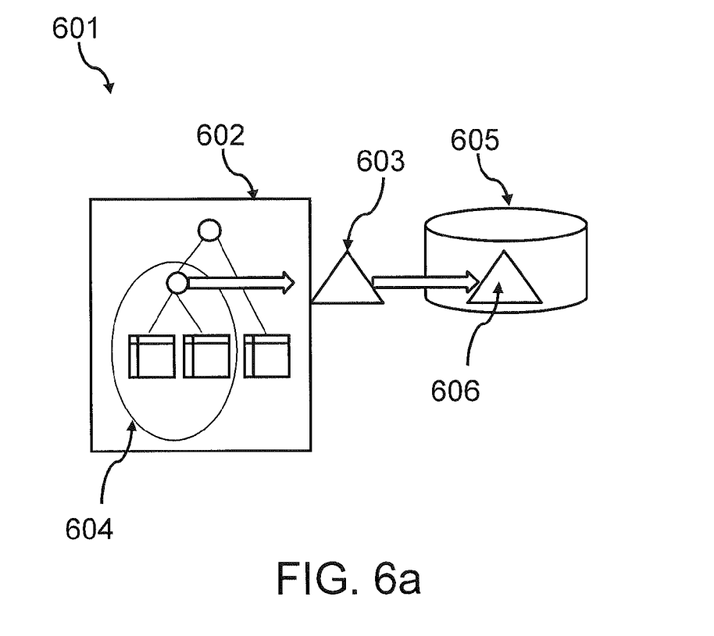
FIG. 6a and FIG. 6b illustrate an overview of the intermediate result set caching and the access plan adaptation process in accordance with an embodiment.
Figure 6B:
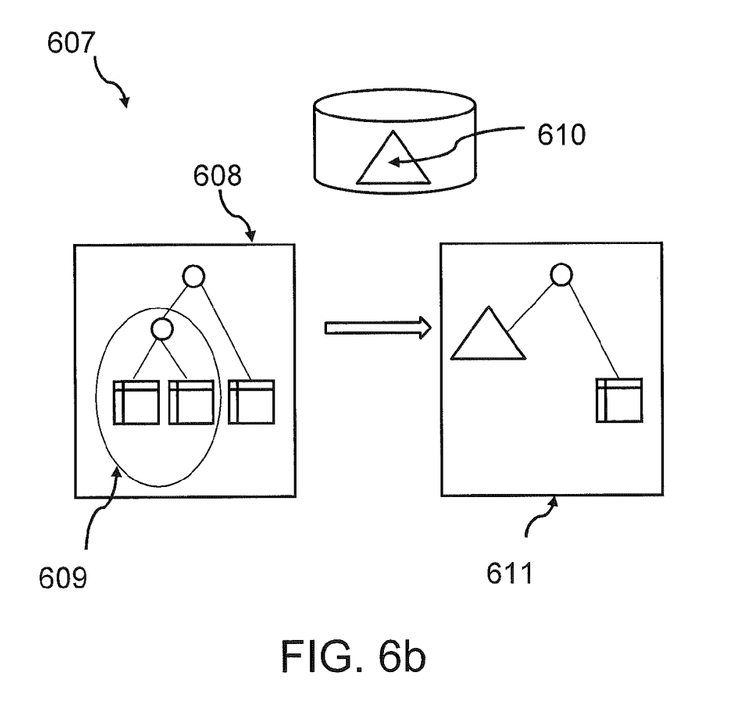

FIG. 6a and FIG. 6b illustrates an overview of the intermediate result set caching 601 and the access plan adaption process 607. FIG. 6a shows an access plan 602, for which it may have been determined that an intermediate result set 603 generated during the execution of an operation 604 of the access plan 602, is to be stored in an intermediate result set cache 605. The stored intermediate result set is illustrated by reference numeral 606.

In FIG. 6b, reference numeral 608 illustrates an access plan, which may include an operation 609, which execution may be avoided by using a cached intermediate result set 610 instead. The adopted access plan using the stored intermediate result set 610 instead may be shown as 611.

Figure 5:
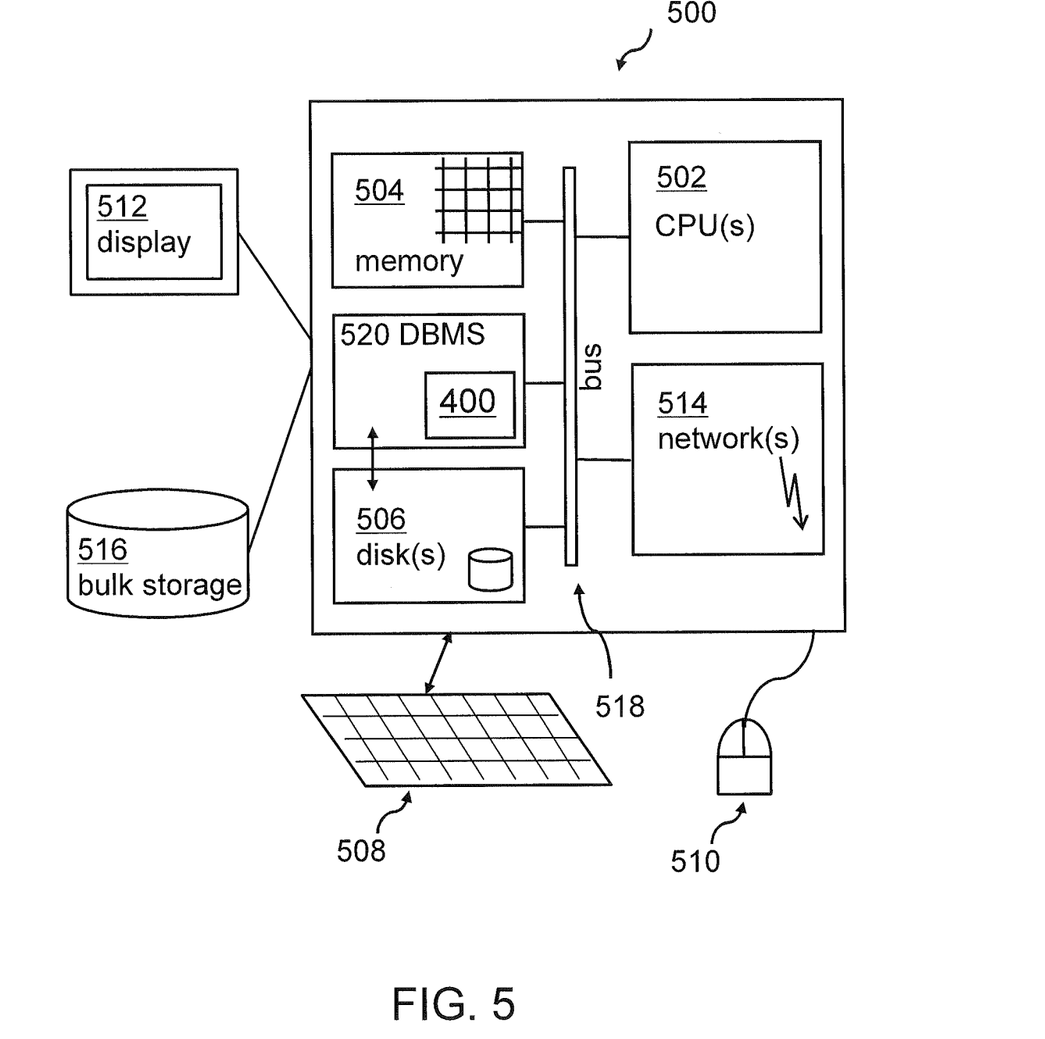
FIG. 5 is a computer system including the intermediate result set storage unit in accordance with an embodiment.

Embodiments may be implemented on virtually any type of computer, regardless of the platform being suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, the intermediate result set storage unit 400—as part of a database management system 520 or independently—may be attached to the bus system 518.

The computer system 500 may also include input means, such as a keyboard 508, a pointing device such as a mouse 510, or a microphone (not shown). Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network, e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments.

Further, those skilled in the art will appreciate that one or more elements of the aforementioned computer system 500 may be located at a remote location and connected to the other elements over a network. Further, embodiments may be implemented on a distributed system having a plurality of nodes, where each portion of the intermediate result set storage unit 400 may be located on a different node within the distributed system. In one embodiment, the node corresponds to a computer system. Alternatively, the node may correspond to a processor with associated physical memory. The node may alternatively correspond to a processor with shared memory and/or resources or a smartphone.

Further, software instructions to perform embodiments may be stored on a computer readable medium, such as a compact disk (CD), a diskette, a tape, or any other computer readable storage device.

While described with respect to a limited number of embodiments, those skilled in the art, having benefit of this disclosure, will appreciate that other embodiments can be devised, which do not depart from the scope as disclosed herein.

It should also be noted that the term "comprising" does not exclude other elements or steps and "a" or "an" does not exclude a plurality. Additionally, the term "comprising" may also include "consisting of". Also, elements described in association with different embodiments may be combined. It should also be noted that reference signs in the claims should not be construed as limiting elements.

What is claimed is:

1. A method for storing intermediate result sets in a database system, the method comprising the steps of:
   receiving an access plan for a single query for accessing data stored in the database system, the access plan comprising a sequence of operations specific to the database system;

generating an intermediate result set during execution of the access plan, the intermediate result set comprising a result set of execution of one of the operations of the access plan;

determining a value of an intermediate result set rating of the intermediate result set during execution of the access plan at runtime of the query for determining if the intermediate result set, generated during the execution of the access plan, is to be stored before storing the intermediate result set; and based on determining that the value of the intermediate result set rating meets a predefined criterion, storing the determined intermediate result set for a longer period of time than the runtime of the query as a stored intermediate result set.

2. The method of claim 1, further comprising: receiving the access plan again and adapting dynamically the re-received access plan during the execution of the access plan, wherein the adaption is based on an existence of the stored intermediate result set.

3. The method of claim 2, further comprising: locking of base data related to the stored intermediate result set before accessing the stored intermediate result set during the execution of the adapted access plan.

4. The method of claim 1, further comprising: receiving a further access plan and adapting dynamically the further access plan during the execution of the further access plan based on an existence of the stored intermediate result set.

5. The method of claim 4, further comprising: locking of base data related to the stored intermediate result set before accessing the stored intermediate result set during the execution of the adapted further access plan.

6. The method of claim 1, further comprising:
monitoring base tables related to the stored intermediate result set; and
marking the stored intermediate result set invalid if related base data are changed.

7. The method of claim 6, further comprising: recalculating of the stored intermediate result set after it was marked invalid.

8. The method of claim 1, wherein the determination of the value of the intermediate result set rating comprises a calculation of costs for generating the intermediate result set, wherein the costs are indicative of resource consumption for the generation of the intermediate result set.

9. The method of claim 1, wherein the determination of the value of the intermediate result set rating comprises a calculation of a volume reduction of the intermediate result set in comparison to a related base data size.

10. The method of claim 1, wherein the determination of the value of intermediate result set rating comprises a calculation of a reuse factor for the intermediate result set, wherein the reuse factor is indicative of a number of accesses to the intermediate result set in comparison to a total number of executed access plans in a predefined timeframe.

11. The method of claim 1, wherein the determination of a value of the intermediate result set rating comprises a determination of an invalidation likelihood due to changes in underlying base data.

12. A system comprising:
a processor operable to access a database management system and execute instructions stored in memory to implement an intermediate result set storage unit, the intermediate result set storage unit comprising:

a receiving unit that receives an access plan for a single query for accessing data stored in the system, the access plan comprising a sequence of operations specific to the system;

a generating unit that generates an intermediate result set during execution of the access plan, the intermediate result set comprising a result set of execution of one of the operations of the access plan;

a determining unit that determines a value of an intermediate result set rating of the intermediate result set during execution of the access plan at runtime of the query for determining if the intermediate result set, generated during the execution of the access plan, is to be stored before storing the intermediate result set; and a storage unit that stores the determined intermediate result set for a longer period of time than the runtime of the query.

13. The system of claim 12, wherein the system includes instructions executable by the processor to receive the access plan again and adapt dynamically the re-received access plan during the execution of the access plan, wherein the adaption is based on an existence of the stored intermediate result set.

14. The system of claim 12, wherein the system includes instructions executable by the processor to receive a further access plan and adapt dynamically the further access plan during the execution of the further access plan based on an existence of the stored intermediate result set.

15. The system of claim 12, wherein the system includes instructions executable by the processor to monitor base tables related to the stored intermediate result set, and mark the stored intermediate result set invalid if related base data are changed.

16. The system of claim 15, wherein the system includes instructions executable by the processor to recalculate the stored intermediate result set after it was marked invalid.

17. The system of claim 12, wherein the determination of the value of the intermediate result set rating comprises a calculation of costs for generating the intermediate result set, wherein the costs are indicative of resource consumption for the generation of the intermediate result set.

18. The system of claim 12, wherein the determination of the value of the intermediate result set rating comprises a calculation of a volume reduction of the intermediate result set in comparison to a related base data size.

19. The system of claim 12, wherein the determination of the value of intermediate result set rating comprises a calculation of a reuse factor for the intermediate result set, wherein the reuse factor is indicative of a number of accesses to the intermediate result set in comparison to a total number of executed access plans in a predefined timeframe.

20. A computer program product for storing intermediate result sets in a database system, the computer program product comprising:
a non-transitory computer readable storage medium having program code embodied therewith, the program code executable by a processor to:
receive an access plan for a single query for accessing data stored in the database system, the access plan comprising a sequence of operations specific to the database system;
generate an intermediate result set during execution of the access plan, the intermediate result set comprising a result set of execution of one of the operations of the access plan;
determine a value of an intermediate result set rating of the intermediate result set during execution of the access plan at runtime of the query for determining if the intermediate result set, generated during the execution of the access plan, is to be stored before storing the intermediate result set; and based on the determination that the value of the intermediate result set rating meets a predefined criterion, store the determined intermediate result set for a longer period of time than the runtime of the query as a stored intermediate result set.

\* \* \* \* \*